Apr. 24, 1923.
R. HARROUN
TRACTOR
Filed May 21, 1920
1,452,557
2 Sheets-Sheet 1
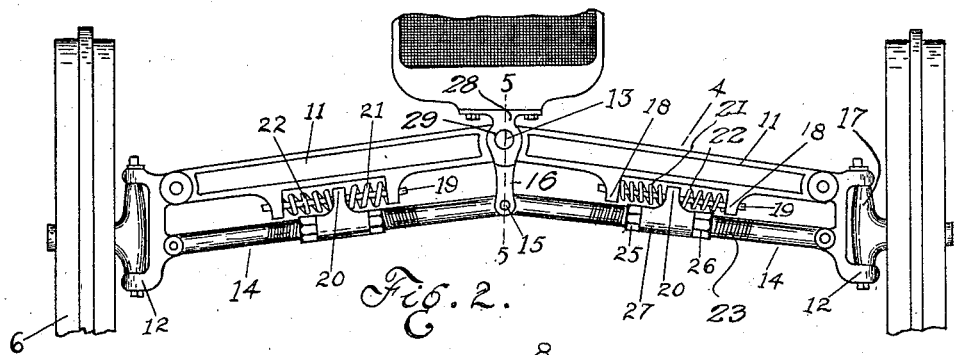
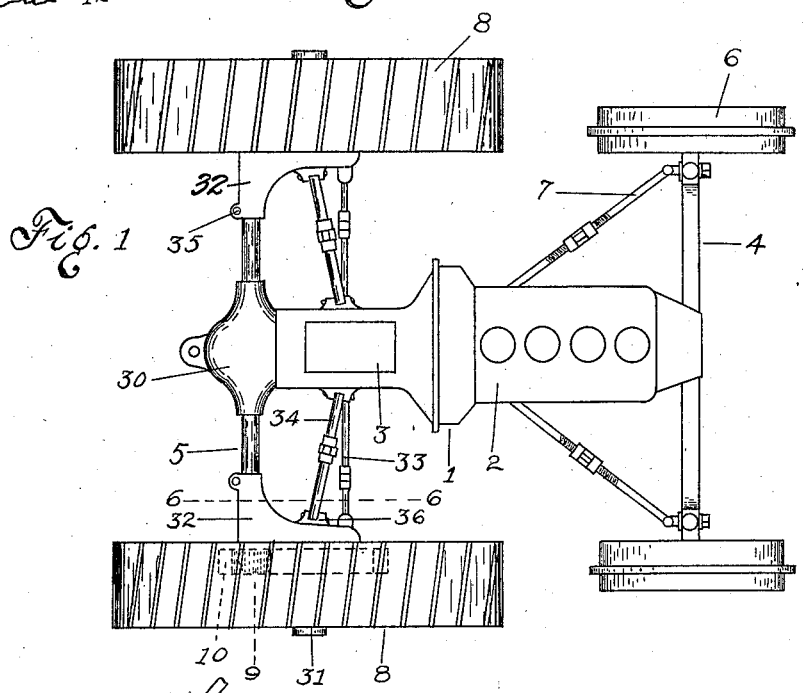
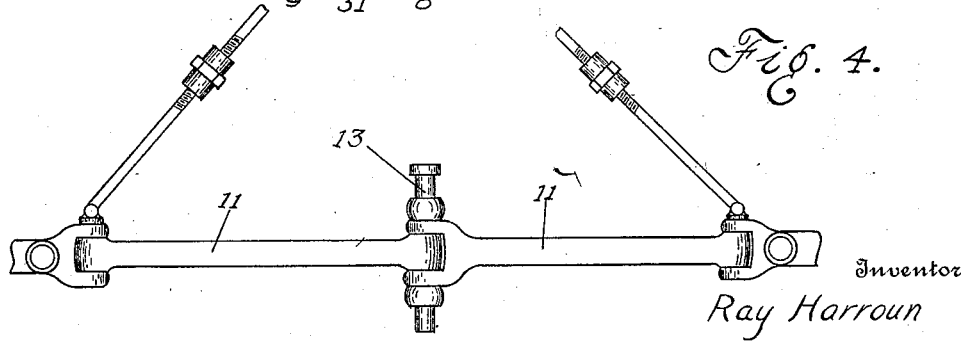
Inventor
Ray Harroun
By Whittemore Hulbert & Whittemore
Attorneys

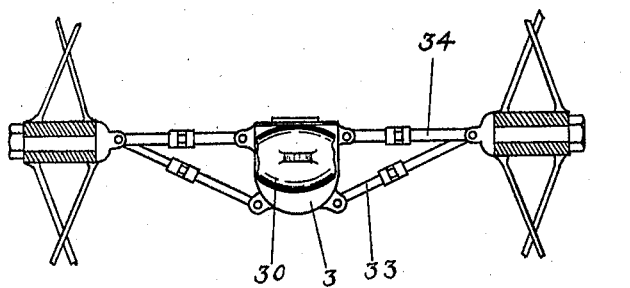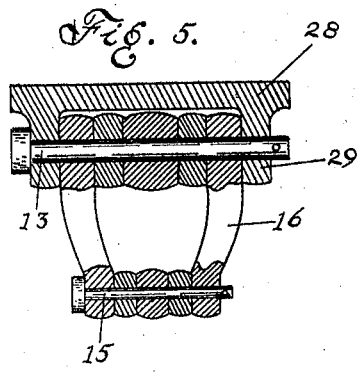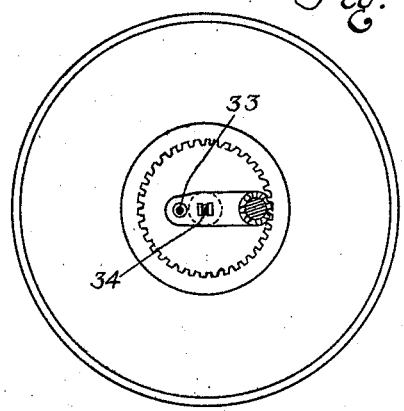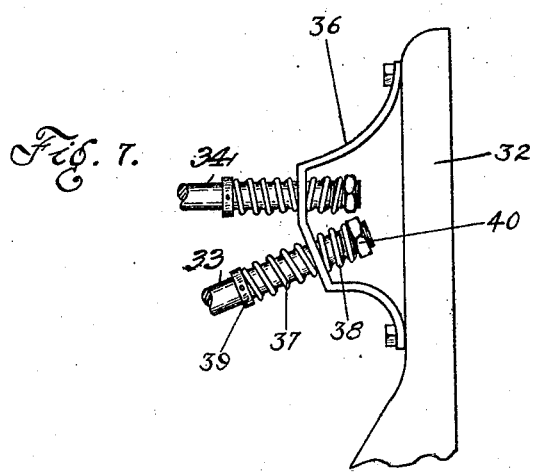

Patented Apr. 24, 1923.

1,452,557

UNITED STATES PATENT OFFICE.

RAY HARROUN, OF DETROIT, MICHIGAN.

TRACTOR.

Application filed May 21, 1920. Serial No. 383,054.

*To all whom it may concern:*

Be it known that I, RAY HARROUN, a citizen of the United States of America, residing at Detroit, in the county of Wayne and State of Michigan, have invented certain new and useful Improvements in Tractors, of which the following is a specification, reference being had therein to the accompanying drawings.

The invention relates to tractors and has for its main object the provision of means for varying the road clearance or height of the tractor frame above the ground. Other objects of the invention reside in the novel arrangements and combination of parts as more fully hereinafter set forth.

In the drawings:

Figure 1 is a top plan view of a tractor embodying my invention;

Figures 2 and 3 are respectively front and rear elevations thereof;

Figure 4 is a top plan view of the front axle;

Figure 5 is a cross section on the line 5—5 of Figure 2;

Figure 6 is a cross section on the line 6—6 of Figure 1;

Figure 7 is a modification.

The tractor has the frame 1 formed of the engine 2 and transmission housing 3 secured to each other, this frame extending between and mounted on the front and rear axles 4 and 5, respectively. 6 are the ground steering wheels pivotally mounted upon the front axle 4, and 7 are suitable brace rods connected to the front axle and to the frame 1. 8 are drive wheels mounted upon the rear axle and suitably driven, as by means of the pinions 9 upon the outer ends of the drive shafts engaging the internal gears 10 secured to the drive wheels.

For the purpose of varying the height of the front end of the tractor frame 1 above the ground, the following construction is provided; the front axle 4 comprises the complementary beams 11 which are pivotally secured to the forks 12 at their outer ends and rotatably engage the pivots 13 at their inner ends. 14 are complementary rods extending parallel to the axes of the beams 11 and pivotally secured to the forks 12 at their outer ends and rotatably engaging the pivot 15 at their inner ends. The pivots 13 and 15 are in vertical alignment and are connected to each other by the links 16. The pivots connected to the outer ends of the corresponding rods and beams are also in vertical alignment, the arrangement being such that a parallelogram construction is secured for each longitudinal half of the axle, so that the pivots 17 for the ground steering wheels 6 are at all times vertically mounted in the forks 12. 18 are depending lugs upon each of the beams 11 and 19 is a rod extending between these lugs and parallel to the axis of the beam. 20 are lugs upon the rods 14, each lug being apertured for the passage of the rod 19, and 21 and 22 are coil springs surrounding each rod 19 on opposite sides of the lug 20 and abutting the same and the lugs 18 upon the beam 11, whereby the parts are yieldably maintained in position.

In order to vary the angularity of the beams and rods relative to the ground, each rod 14 is formed with a threaded portion 23 which is engageable by the nuts 25 and 26 respectively. The lug 20 is formed upon the sleeve 27 which slidably engages the threaded portion 23. In operation, by screwing the nuts 25 and 26 to move the same towards the pivot 15, the sleeve 27 with its lug 20 may be correspondingly moved thereby tending to increase the compression of the spring 21, so that the angularity of the beam and rod relative to the ground increases and the height of their inner ends above the ground increases. By screwing the nuts in the opposite direction, the inner ends of the beam and rod can be lowered thereby decreasing the height of the tractor frame above the ground.

The lengths of the brace rods 7 are adjustable to permit of the relative movement of the tractor frame and outer ends of the front axle.

The front end of the tractor frame 1 is mounted upon the bracket 28, which has the depending lugs 29 rotatably engaging the pivot 13, whereby the tractor frame has a 3 point suspension, the rear end of the frame being rigidly secured to the rear axle 5 through the differential housing 30.

To raise the rear end of the tractor frame 1 relative to the ground, the spindles 31 of the drive wheels 8 are mounted upon the arms 32 which are rotatably adjustably mounted upon the rear axle housing. 33 are rods secured to the outer ends of the arms 32 and to the transmission housing 3 near its bottom. 34 are other rods secured to the arms 32 near their outer ends and to the transmission housing 3 near its top. The lengths of these rods are adjustable, so that with the parts in the positions shown in Figure 3 by increasing the lengths of the rods 34 and decreasing the lengths of the rods 33 after releasing the clamping pressure of the arms upon the rear axle housing, the arms are swung downwardly, thereby raising the rear axle and the rear of the tractor frame 1 relative to the ground. By increasing the lengths of the rods 33 and 34 the rear of the tractor frame is lowered.

35 are bolts for clamping the arms 32 upon the rear axle housing.

As shown in the modification in Figure 6, the rods 33 and 34 are yieldably connected to the arms 32. The rods pass through brackets 36 secured to the arms and coil springs 37 and 38 surround the rods. The springs 37 abut the collars 39 upon the rods and the outer faces of the brackets while the springs 38 abut the nuts 40 and the inner faces of the brackets.

Although I have described this construction in connection with a tractor, it is to be understood that the same is applicable to other types of motor vehicles, such as trucks.

What I claim as my invention is:

1. The combination with a vehicle frame, of front and rear axles upon which said frame is mounted, ground engaging wheels upon said axles, and means for varying the height of said frame relative to said wheels, including means for adjusting said front axle.

2. The combination with a vehicle frame, of front and rear axles upon which said frame is mounted, wheels at the opposite ends of said axles and rotatably mounted thereon, and means for varying the height of said frame relative to the axes of rotation of said wheels, including means for adjusting said front axle.

3. The combination with a rear axle, of a vehicle frame mounted thereon, ground engaging wheels at opposite ends of said axle, spindles for said wheels, arms carrying said spindles and rotatably adjustably mounted upon said axle and adjustable tension connections between said arms and frame for rotating said arms about said axle.

4. The combination with a rear axle, of a vehicle frame mounted on said axle, ground engaging wheels at opposite ends of said axle, spindles for said wheels, arms carrying said spindles and rotatably adjustably mounted upon said axle, rods connected to said frame and yieldably connected to said arms and means for varying the lengths of said rods to rotate said arms about said axle.

5. The combination with an axle, of a vehicle frame mounted on said axle, arms rotatably adjustably mounted upon said axle, ground engaging wheels journalled upon said arms, and a pair of adjustable rods connected to said frame and to said arms for varying the rotative positions of said arms about said axle.

6. The combination of a vehicle frame, arms rotatably adjustably connected to said frame, ground engaging wheels journalled upon said arms, and a pair of adjustable rods connected to each of said arms and to said vehicle frame to vary the rotative positions of said arms relative to said frame.

7. The combination with a vehicle frame, of front and rear axles upon which said frame is mounted, ground engaging wheels at opposite ends of said axles, spindles for said wheels, supports for said spindles rotatably mounted upon said axles, and means extending between said supports and said frame for adjusting the height of said frame relative to all of said wheels.

In testimony whereof I affix my signature.

RAY HARROUN.